(12) United States Patent
Miyakawa et al.

(10) Patent No.: US 11,819,890 B2
(45) Date of Patent: Nov. 21, 2023

(54) NOZZLE CLEANER AND AUTOMATIC ANALYZER USING THE SAME

(71) Applicant: Hitachi High-Technologies Corporation, Tokyo (JP)

(72) Inventors: Takushi Miyakawa, Tokyo (JP); Gorou Yoshida, Tokyo (JP); Yuto Tanaka, Tokyo (JP); Kohei Nonaka, Tokyo (JP); Takamichi Mori, Tokyo (JP); Tetsuji Kawahara, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 1138 days.

(21) Appl. No.: 16/468,008

(22) PCT Filed: Dec. 8, 2017

(86) PCT No.: PCT/JP2017/044138
§ 371 (c)(1),
(2) Date: Jun. 10, 2019

(87) PCT Pub. No.: WO2018/123508
PCT Pub. Date: Jul. 5, 2018

(65) Prior Publication Data
US 2020/0009623 A1    Jan. 9, 2020

(30) Foreign Application Priority Data
Dec. 27, 2016  (JP) ................. 2016-252225

(51) Int. Cl.
*B08B 9/032*     (2006.01)
*G01N 35/10*     (2006.01)

(52) U.S. Cl.
CPC .......... *B08B 9/0326* (2013.01); *B08B 9/0325* (2013.01); *G01N 35/10* (2013.01); *G01N 35/1004* (2013.01); *B08B 2209/005* (2013.01)

(58) Field of Classification Search
CPC ................ B05B 15/00–80; B08B 3/12; B08B 7/026–028; B08B 9/00–46;
(Continued)

(56) References Cited

U.S. PATENT DOCUMENTS 5,493,922 A * 2/1996 Ramey ................. G01F 23/266
                                                                       73/304 C
7,141,150 B1 * 11/2006 Welch ..................... C23F 13/02
                                                                       204/196.07
(Continued)

FOREIGN PATENT DOCUMENTS

JP     S6042635    *  3/1985
JP     H0277592    *  3/1990
(Continued)

OTHER PUBLICATIONS

International Search Report of PCT/JP2017/044138 dated Feb. 6, 2018.

*Primary Examiner* — Mikhail Kornakov
*Assistant Examiner* — Richard Z. Zhang
(74) *Attorney, Agent, or Firm* — MATTINGLY & MALUR, PC (57) ABSTRACT

A nozzle cleaner includes: a cleaning tank which stores a cleaning solution; a first conductive member that is disposed to be immersed into the cleaning solution stored in the cleaning tank when the nozzle is cleaned; an ultrasonic wave generating mechanism which is disposed so that at least a part of a second conductive member is immersed into the cleaning solution stored in the cleaning tank when the nozzle is cleaned and generates an ultrasonic vibration in the cleaning solution stored in the cleaning tank; a first voltage control unit which controls a potential applied to the first conductive member; and a second voltage control unit which controls a potential applied to the second conductive member, wherein the first voltage control unit applies a second (Continued)

potential $V_2$ higher than a first potential $V_1$ applied to the nozzle when the nozzle is cleaned to the first conductive member.

8 Claims, 5 Drawing Sheets

(58) Field of Classification Search
CPC .......... B08B 2209/005; G01N 1/00–44; G01N 35/00–1097; C23F 13/00–22
See application file for complete search history.

(56) References Cited

U.S. PATENT DOCUMENTS

| | | |
|---|---|---|
| 2011/0293474 A1 | 12/2011 | Sugimura et al. |
| 2016/0061644 A1* | 3/2016 | Ma .......................... B01L 13/02 422/69 |

FOREIGN PATENT DOCUMENTS

| | | | |
|---|---|---|---|
| JP | H07243949 | * | 9/1995 |
| JP | H07243949 A | * | 9/1995 |
| JP | 2010-133727 A | | 6/2010 |
| JP | 2012-008123 A | | 1/2012 |
| JP | 2012197502 | * | 10/2012 |
| JP | 2013044692 | * | 3/2013 |

* cited by examiner

NOZZLE CLEANER AND AUTOMATIC ANALYZER USING THE SAME

TECHNICAL FIELD

The present invention relates to a nozzle cleaner for cleaning a nozzle that dispenses such sample as serum and urine, and an automatic analyzer provided with the nozzle cleaner for conducting component analysis of a sample-reagent mixture.

BACKGROUND ART

As the automatic analyzer is configured to dispense the sample by using the same nozzle repeatedly, a tip portion of the nozzle is cleaned before suction of another sample. Insufficient cleaning of the tip portion of the nozzle leads to carry-over of the component of the previously dispensed sample into the next sample, resulting in deteriorated measurement accuracy. Patent Literature 1 discloses the method of removing the stain on the inner or outer surface of the tip portion of the nozzle not only by washing with deionized water but also immersing the tip portion of the nozzle in a detergent stored in a part of the cleaning tank.

Patent Literature 2 discloses the ultrasonic cleaner for nozzle in the form of the ultrasonic cleaning tank having piezoelectric elements (vibrator array) disposed in the cleaning tank capable of storing liquid.

CITATION LIST

Patent Literature

PTL 1: Japanese Unexamined Patent Application Publication No. 2012-008123
PTL 2: Japanese Unexamined Patent Application Publication No. 2010-133727

SUMMARY OF INVENTION

Technical Problem

In most cases, the nozzle made of metal excellent in mechanical wear resistance and chemical corrosion resistance has been employed for the automatic analyzer. Furthermore, in order to detect the liquid level of the sample or the reagent, a liquid level detection method utilizing change in electric characteristics such as electrostatic capacity and resistance value between timings before and after contact of the nozzle with the liquid. The above-described liquid level detection method allows liquid level detection by applying a predetermined voltage to the metallic (conductive) nozzle.

It is assumed that the cleaning solution which contains an electrolyte is stored in the cleaning tank as disclosed in Patent Literature 1, and the nozzle is cleaned by the cleaning mechanism as disclosed in Patent Literature 2. As the cleaning mechanism disclosed in Patent Literature 2 has the vibrator array provided with the metallic member disposed inside the cleaning tank, the metallic nozzle is immersed together with the metallic member (vibrator array) of the cleaning mechanism in the same electrolyte aqueous solution upon cleaning of the nozzle. When enabling the liquid level detection function of the nozzle for monitoring normal immersion of the nozzle in the electrolyte aqueous solution in the above-described state, the nozzle side becomes the positive electrode through application of the predetermined voltage to the nozzle. This may cause the risk of electric corrosion on the nozzle surface. As described above, the change in the nozzle surface state may adversely affect the carry-over and accuracy in the dispensing amount.

The present invention provides the nozzle cleaner for cleaning the nozzle, which includes the liquid level detection function so as to prevent unintended electric corrosion, and the automatic analyzer provided with the nozzle cleaner.

Solution to Problem

The nozzle cleaner for cleaning a nozzle of a dispensing mechanism having a liquid level detection function includes a cleaning tank which stores a cleaning solution, a first conductive member disposed to be immersed in the cleaning solution stored in the cleaning tank in cleaning the nozzle, and a first voltage control unit for controlling a potential to be applied to the first conductive member. The first voltage control unit applies a second voltage to the first conductive member. The second potential is higher than the first potential to be applied to the nozzle in cleaning the nozzle.

The nozzle cleaner further includes an ultrasonic generation mechanism provided with a second conductive member disposed so as to be at least partially immersed in the cleaning solution stored in the cleaning tank in cleaning the nozzle for generating ultrasonic vibration in the cleaning solution stored in the cleaning tank, and a second voltage control unit for controlling the potential to be applied to the second conducive member. The second voltage control unit applies the potential equal to the first potential, or a third potential higher than the first potential to the second conductive member.

It is possible to apply the second potential to the second conductive member as a substitute for the first conductive member.

Advantageous Effects of Invention

It is possible to use both the detergent which contains electrolyte with high cleaning effect and the ultrasonic cleaner provided with the metallic member in the cleaning tank while retaining the liquid level detection function of the nozzle, thus providing the nozzle cleaner exhibiting high cleaning effect.

DESCRIPTION OF EMBODIMENT

An embodiment according to the present invention will be described in detail referring to the drawings.

Figure 1:
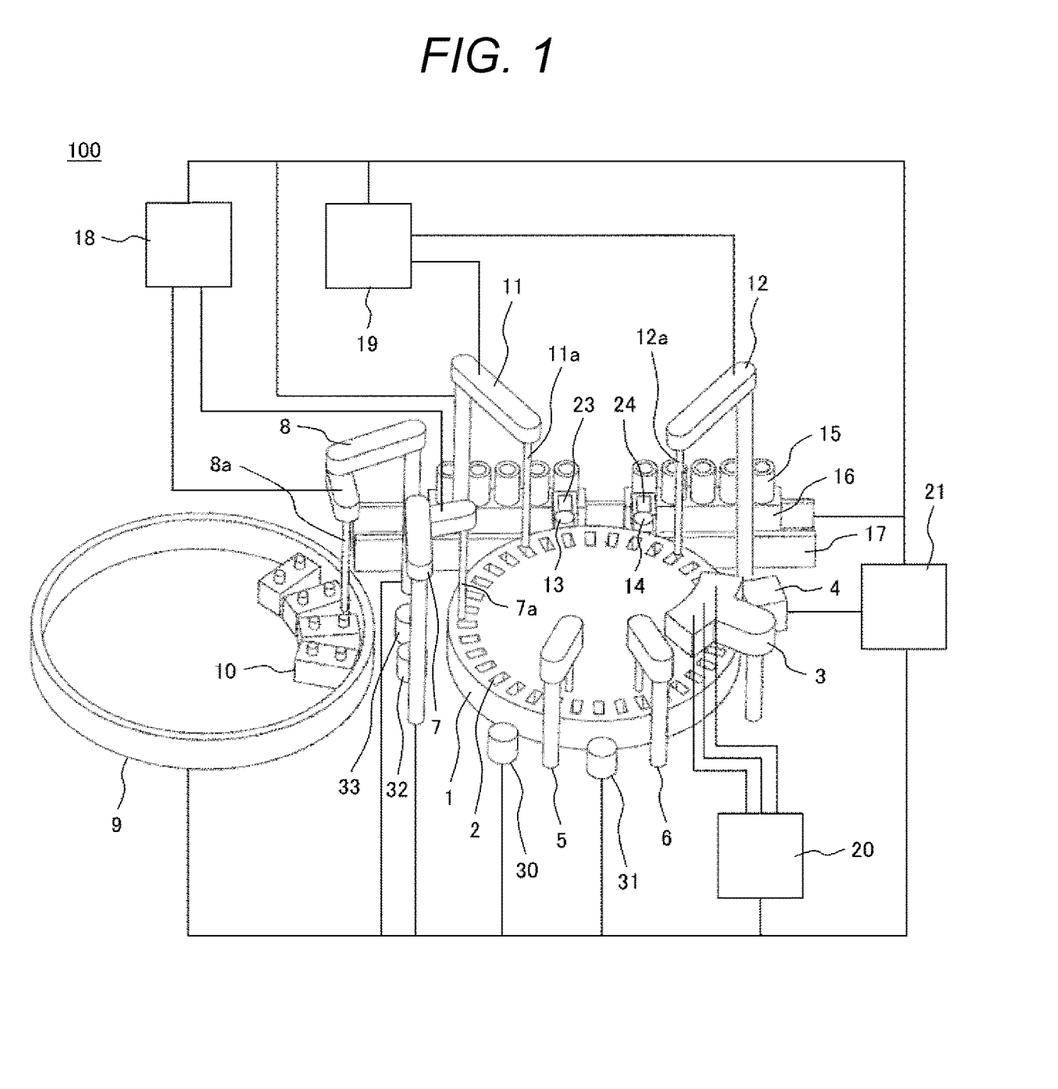
FIG. 1 is a schematic diagram of an automatic analyzer.

FIG. 1 is a schematic diagram of an automatic analyzer 100. The biological sample to be analyzed such as blood and urine (hereinafter simply referred to as a sample) is stored in a sample container 15. One or more sample containers 15 are mounted on a sample rack 16, and transferred by a sample transfer mechanism 17. A reagent used for sample analysis is stored in a reagent bottle 10. Multiple reagent bottles 10 are circumferentially arranged on a reagent disk 9. The sample and the reagent are mixed for reaction in a reaction vessel 2. Multiple reaction vessels 2 are circumferentially arranged on a reaction disk 1. The sample container 15 is transferred to a sample dispensing position by the sample transfer mechanism 17. Then the sample is dispensed from the sample container 15 to the reaction vessel 2 by a first or a second sample dispensing mechanism 11 or 12. Meanwhile, the reagent is dispensed from the reagent bottle 10 to the reaction vessel 2 by reagent dispensing mechanisms 7, 8. A mixture liquid (reaction liquid) of the sample and the reagent which have been dispensed to the reaction vessel 2 is stirred by stirring mechanisms 5, 6. The transmitted light from a not shown light source through the reaction liquid in the reaction vessel 2 is measured by a spectrophotometer 4 so that absorbance of the reaction liquid is measured. The automatic analyzer 100 executes an analysis process by calculating the predetermined constituent concentration of the analysis item corresponding to the reagent in accordance with the absorbance of the mixture liquid (reaction liquid) measured by the spectrophotometer 4. The measured reaction vessel 2 is cleaned by a cleaning mechanism 3.

The first (second) sample dispensing mechanism 11 (12) includes a sample nozzle 11a (12a) which is disposed having its tip portion directed downward. A sample pump 19 is connected to the sample nozzle 11a (12a). The first (second) sample dispensing mechanism 11 (12) is structured to be horizontally rotated, and vertically operated so that the sample nozzle 11a (12a) is inserted into the sample container 15 for suction of the sample, and inserted into the reaction vessel 2 for discharging the sample. The sample is then dispensed from the sample container 15 to the reaction vessel 2. An ultrasonic cleaner (nozzle cleaner) 23 (24) for cleaning the sample nozzle 11a (12a) with cleaning solution is disposed in an operation range of the first (second) sample dispensing mechanism 11 (12). A cleaning tank 13 (14) is disposed for cleaning the sample nozzle 11a (12a) so that the cleaning solution other than water is washed out with water.

The reagent dispensing mechanisms 7, 8 include reagent nozzles 7a, 8a, respectively each tip portion of which is directed downward. A reagent pump 18 is connected to the reagent nozzles 7a, 8a. The reagent dispensing mechanisms 7, 8 are structured to be horizontally rotated, and vertically operated so that the sample nozzles 7a, 8a are inserted into the reagent bottles 10 for suction of the reagent, and inserted into the reaction vessels 2 for discharging the sample. The sample is then dispensed from the reagent bottle 10 to the reaction vessel 2. Cleaning tanks 32, 33 for cleaning the sample nozzles 7a, 8a with the cleaning solution are disposed in operation ranges of the reagent dispensing mechanisms 7, 8, respectively.

The stirring mechanisms 5, 6 are structured to be horizontally rotated, and vertically operated. They are inserted into the reaction vessel 2 so that the mixture liquid (reaction liquid) of the sample and the reagent is stirred. Cleaning tanks 30, 31 for cleaning the stirring mechanisms 5, 6 with the cleaning solution are disposed in operation ranges of the stirring mechanisms 5, 6. A cleaning pump 20 is connected to the cleaning mechanism 3.

Overall operations of the automatic analyzer 100 are controlled by a control unit 21. FIG. 1 omits a connection portion between the respective mechanisms and the control unit 21 which constitute the automatic analyzer 100 for simplifying the illustration.

Figure 2A:
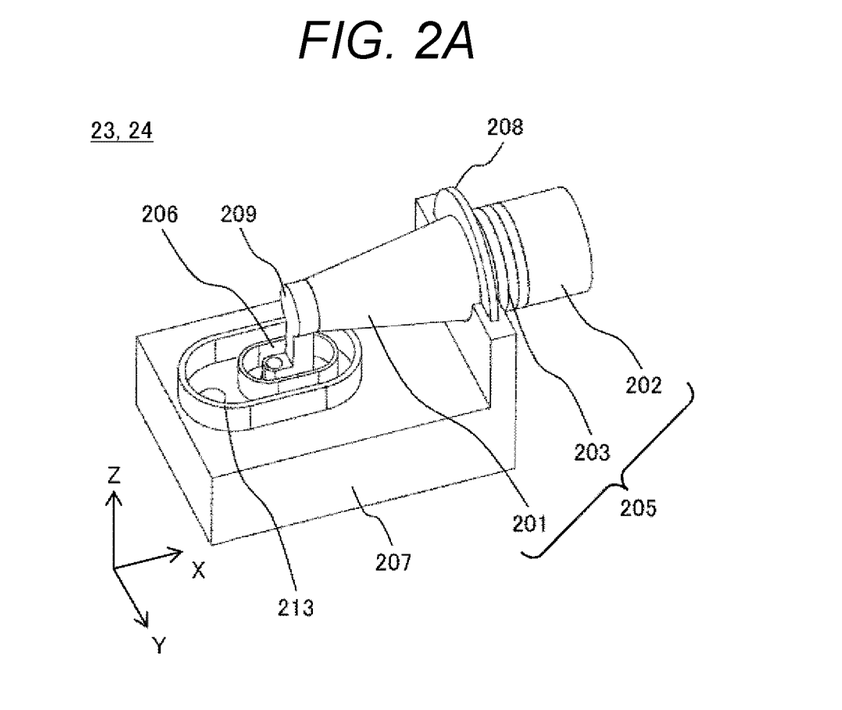
FIG. 2A is a perspective view of an ultrasonic cleaner.
Figure 2B:
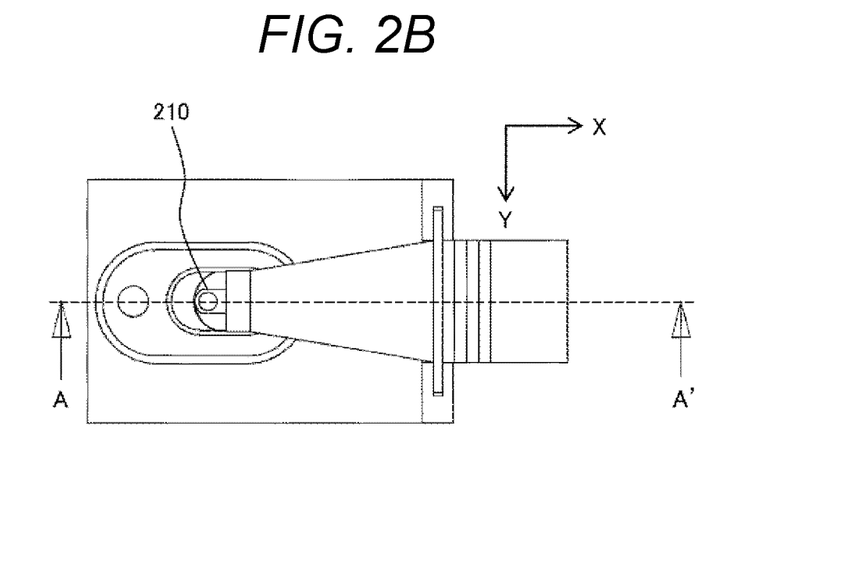
FIG. 2B is a top view of the ultrasonic cleaner.
Figure 2C:
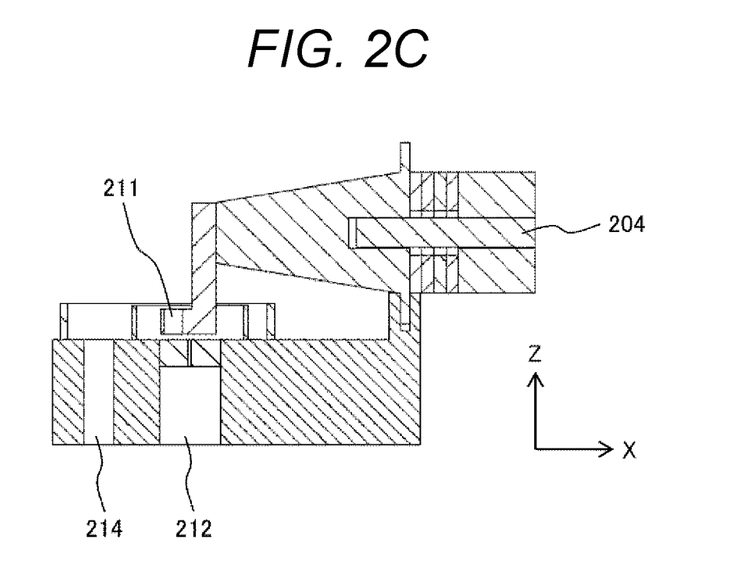
FIG. 2C is a cross-sectional view of the ultrasonic cleaner taken along a line A-A'.
Figure 2D:
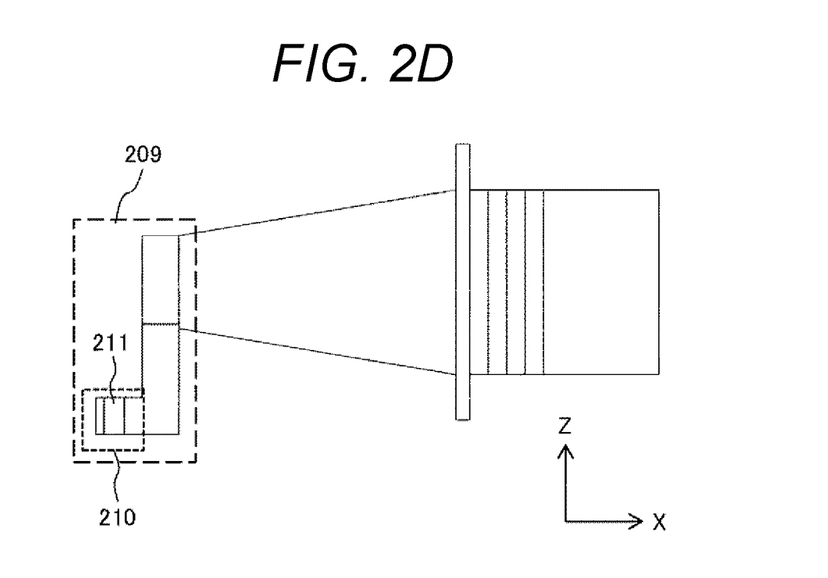
FIG. 2D is a side view of an ultrasonic transducer and a vibration head.

A structure example of the ultrasonic cleaners 23, 24 will be described referring to FIGS. 2A to 2D. FIG. 2A is a perspective view of the ultrasonic cleaner 23 or 24. FIG. 2B is a top view. FIG. 2C is a cross-sectional view taken along a line A-A' (FIG. 2B). FIG. 2D is a side view of the ultrasonic transducer and the vibration head.

Each of the ultrasonic cleaners 23, 24 includes an ultrasonic transducer (BLT: Bolt-clamped Langevin Type Transducer) 205 having one or more piezoelectric elements 203 tightened between a front mass 201 and a back mass 202 with a bolt 204, a vibration head 209, and a base portion 207 on which a cleaning tank 206 which stores the cleaning solution is disposed. In this case, an axial direction of the bolt 204 of the ultrasonic transducer 205 is designated as an X-direction, a direction perpendicular to the X-direction with respect to the top surface (horizontal plane) of the base portion 207 is designated as a Y-direction, and a direction perpendicular to the horizontal plane, that is, the vertical direction is designated as a Z-direction.

The ultrasonic transducer 205 includes a flange portion 208, and is fixed to the base portion 207. As the drawing shows, the ultrasonic transducer is fixed to the base portion 207 at the lower side of the flange portion 208. A member for fixing the flange may be provided at the upper side of the flange portion 208 so as to be connected to the base portion 207 for uniform fixation with entire circumference of the flange portion 208.

The ultrasonic transducer 205 includes a vibration head 209 attached to a tip portion at the front mass side while being extended toward the cleaning tank 206. A tip portion 210 of the vibration head 209 has a cylindrical shape, and is positionally adjusted to be immersed in the cleaning solution stored in the cleaning tank 206 while being not in contact with the cleaning tank 206. The cylindrical vibration head tip portion 210 has a cylindrical hole larger than an outer diameter of the tip portion of the sample nozzle. The metal block (201, 202) and the vibration head 209 are metallic members. It is possible to produce the front mass 201 and the vibration head 209 individually, and fix them with a bolt or the like. Alternatively, they may be integrally produced. The cleaning tank 206 includes a pipe 212 for supplying the cleaning solution. The cleaning solution inside the cleaning tank 206 is overflown by supply of a constant amount of cleaning solution for replacement of the solution. Specifically, the cleaning solution supplied from the cleaning solution supply pipe 212 overflows from the upper end of a side wall of the cleaning tank 206, and further flows into a liquid receiver 213 at an outer periphery of the cleaning tank 206 so as to be discharged from a drainage 214. As a result, the height (liquid level) of the cleaning solution inside the cleaning tank 206 is fixed at each supply of the cleaning fluid. It is possible to use resin for forming the cleaning tank 206, and the base portion 207 in a non-restricted manner.

Although not shown in the drawing, an electrode (for example, a copper plate) is interposed between a metal block (201, 202) and the piezoelectric element 203, and between the piezoelectric elements 203. A sinusoidal voltage at a predetermined frequency is applied to the above-described electrode to drive the ultrasonic transducer 205 in the axial direction of the bolt 204. Especially, it has been known that the front mass 201 is formed into a horn shape (diameter at the side of the piezoelectric element 203 is changed to be different from the diameter at the vibration head side) to ensure increase in the amplitude generated by the piezoelectric element 203. The large amplitude may be obtained with less electric power by designing the length or shape of the horn in accordance with the required frequency for driving.

Although the drawing shows the conical horn shape, any other shape (exponential horn) is usable without causing problems.

The long narrow vibration head 209 is attached to the tip portion of the horn-shaped front mass 201, and vibrated resonantly in synchronization with vibration of the ultrasonic transducer 205 so as to allow large displacement at the vibration head tip portion 210. This makes it possible to convert the electric energy applied to the ultrasonic transducer 205 efficiently into vibration (kinetic energy) of the vibration head tip portion 210.

When cleaning the sample nozzles 11a, 12a using the ultrasonic cleaners 23, 24, the piezoelectric element 203 is driven at the predetermined low frequency to insert the sample nozzles into the cylindrical hole 211 of the vibration head tip portion 210 so as to be immersed in a cleaning range (about 5 mm from the tip portion of the sample nozzles) for a predetermined time period. The stain adhered to the outer periphery of the sample nozzles is removed by the cavitation. After cleaning, the sample nozzles is pulled out from the ultrasonic cleaner to allow the cleaning solution inside the cleaning tank 206 to be overflown and replaced so that the next sample nozzles is cleaned with new cleaning solution while suppressing the carry-over. The above-described control is executed by the control unit 21 in accordance with the predetermined device sequence.

The ultrasonic cleaners 23, 24 drive the piezoelectric elements 203 at the frequency ranging from 20 to 100 kHz suitable for generation of the cavitation in the cleaning solution so as to vibrate the vibration head 209 resonantly inside the cleaning tank 206. The resultant largely displaced vibration (the frequency equal to the drive frequency) generates the ultrasonic vibration. Accordingly, the cavitation occurs around the vibration head 209, especially a vibration antinode (the part at the largest amplitude). The vibration head tip portion 210 as the open end corresponds to the vibration antinode. Therefore, the cavitation generated in the cylindrical hole 211 serves to intensively clean the tip portion of the sample nozzle. The use of water as the cleaning solution also provides high cleaning effect by the cavitation as well. For example, the use of warm water is effective for removing the protein originated stain. It is possible to use the cleaning solution adapted to the intended cleaning effect.

Figure 3:
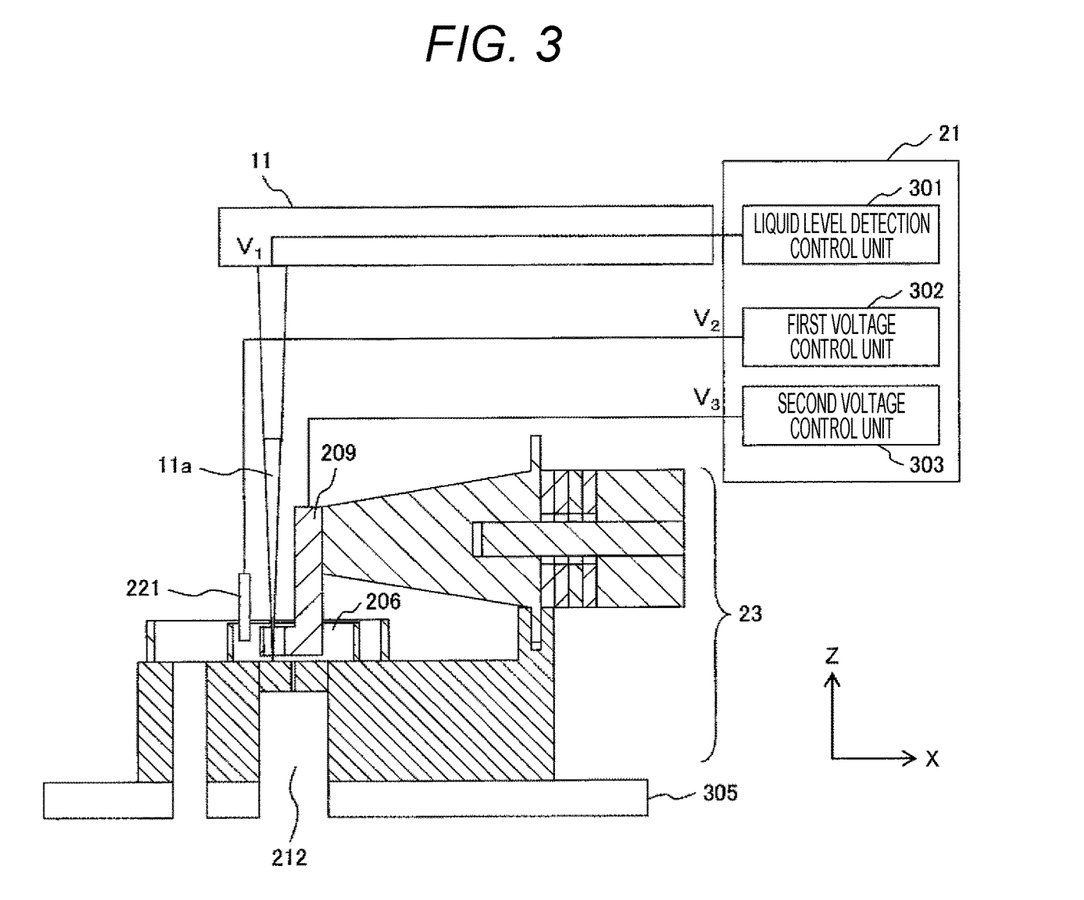
FIG. 3 is a diagram illustrating a state where a sample nozzle is immersed into a cleaning tank.

FIG. 3 shows the state in which the sample nozzle 11a is immersed in the cleaning solution inside the cleaning tank 206. As the sample nozzle 12a has the same function as that of the sample nozzle 11a, the explanation will be made with respect to the sample nozzle 11a as a representative example.

According to the embodiment, the control unit 21 includes a liquid level detection control unit 301, a first voltage control unit 302, and a second voltage control unit 303.

The sample nozzle 11a has a liquid level detection function which is enabled in cleaning the nozzle for monitoring the normal nozzle cleaning so as to confirm that the nozzle has been immersed in the cleaning solution inside the cleaning tank. The liquid level detection control unit 301 applies a predetermined potential $V_1$ to the sample nozzle 11a. Meanwhile, the ultrasonic cleaner 23 is disposed on a stage 305 made of metal at a reference potential GND (±0 V). The electrostatic capacity between the sample nozzle 11a and the stage 305 which face with each other via air is different from the one between the sample nozzle 11a and the stage 305 which face with each other via the cleaning solution. Detection of change in the electrostatic capacity allows confirmation with respect to immersion of the nozzle in the cleaning solution inside the cleaning tank.

In using the cleaning solution that contains the electrolyte for the structure according to the embodiment, as the metallic sample nozzle 11a and the metallic vibration head 209 are immersed in the same electrolyte solution, and the predetermined voltage is applied to the sample nozzle 11a for liquid level detection, there may cause the risk of electric corrosion of the sample nozzle 11a. Consequently, in the embodiment, a metallic member 221 in contact with the cleaning solution inside the cleaning tank 206 is disposed so as to receive application of a predetermined potential $V_2$ to the metallic member 221 from the first voltage control unit 302. In this case, the potential $V_2$ applied to the metallic member 221 is made higher than the potential $V_1$ applied to the sample nozzle 11a to be protected so that the corrosion of the sample nozzle 11a is suppressed. In the case of setting the potential $V_1$ applied to the sample nozzle 11a to +5 V, for example, the potential $V_2$ applied to the metallic member 221 is controlled to be set to +15 V.

If the potential applied to the vibration head 209 is lower than the potential $V_1$ applied to the sample nozzle 11a (for example, 0 V), the risk of corrosion of the sample nozzle 11a still exists. It is therefore preferable to apply the potential equal to the potential $V_1$ applied to the sample nozzle 11a, or a potential $V_3$ higher than the potential $V_1$ to the vibration head 209 from the second voltage control unit 303. Establishment of the correlation among the potential values of $V_1 \leq V_3 < V_2$ secures the effect of preventing corrosion of both the sample nozzle 11a and the vibration head 209.

On the other hand, if the corrosion of the vibration head 209 is tolerated, the use of the metallic member 221 as shown in FIG. 3 is omittable. That is, the first voltage control unit 302 applies the potential $V_2$ higher than the potential $V_1$ applied to the sample nozzle 11a to the vibration head 209 as a substitute for the metallic member 221.

Each of the above-described potentials $V_1$, $V_2$, $V_3$ has the reference potential GND in common, for example, the potential of a casing of the automatic analyzer having the ultrasonic cleaner disposed is usable as the reference potential GND.

With the structure having the metallic member 221 omitted as shown in FIG. 3, in the case that the cleaning solution is brought into a floating state through isolation from the periphery so as to control that the potential applied to the vibration head 209 to be equal to the one applied to the sample nozzle 11a, the effect of preventing the corrosion may be obtained theoretically. However, in the case of the automatic analyzer configured to perform cleaning of the sample nozzle 11a and replacement of the cleaning solution inside the cleaning tank 206 after cleaning repeatedly in accordance with the predetermined sequence, it is actually difficult to bring the potential of the cleaning solution into a complete floating state. Although not shown, actually, electromagnetic valves, pumps, branch pipes, and any other pipe members are wetted in the cleaning solution for supplying the cleaning solution to the cleaning tank 206. If any part of the above-described components is grounded or made of the conductive material, potential difference occurs in the electrolyte solution even if the vibration head 209 and the sample nozzle 11a have been controlled to be at the same potential, causing the risk of corrosion. For controlling the vibration head 209 and the sample nozzle 11a to be at the same potential, it is preferable to allow the metallic member 221 which receives application of the potential higher than those of the vibration head 209 and the sample nozzle 11a to be disposed in the cleaning solution so as to be in the wetted state as the structure of FIG. 3 shows.

Figure 4:
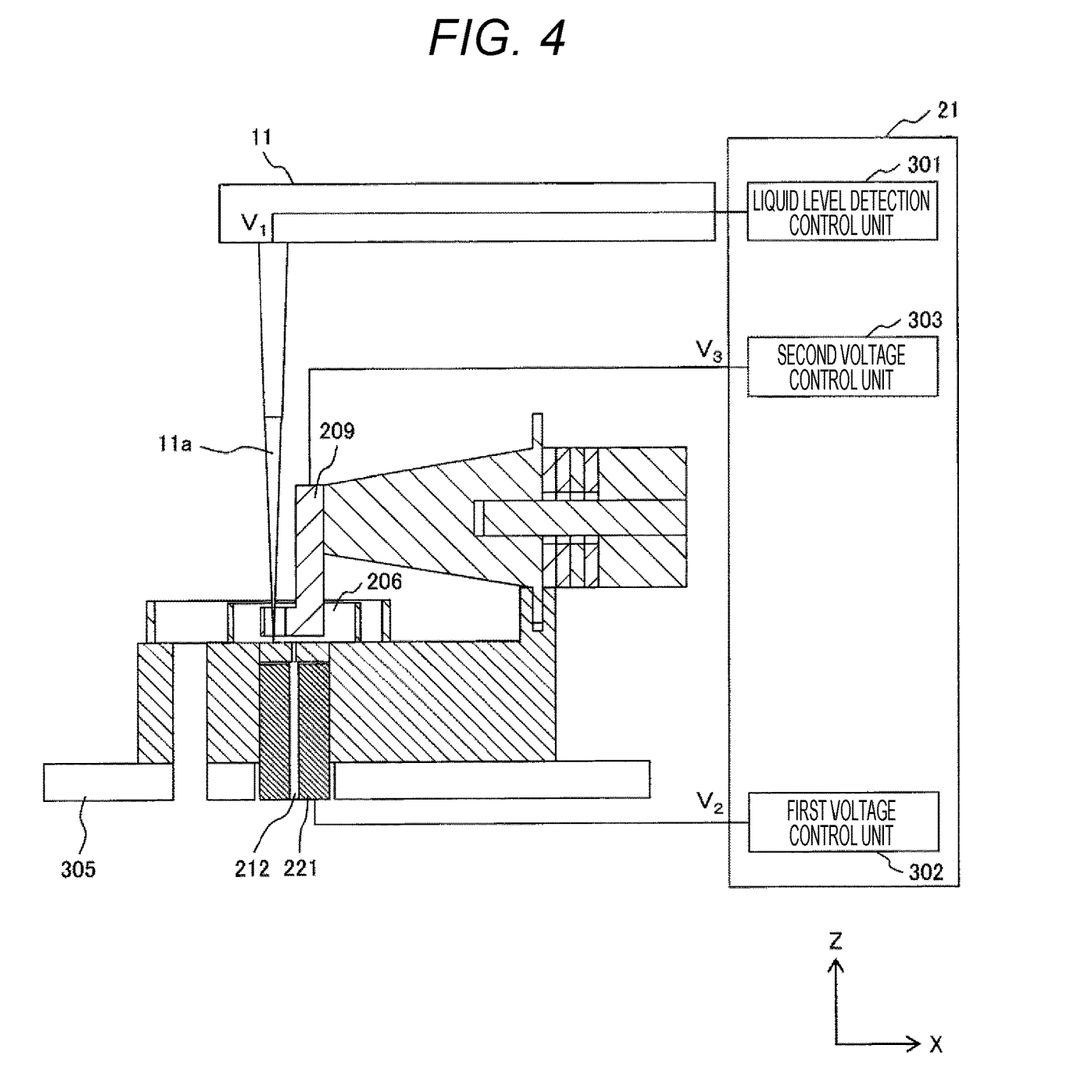
FIG. 4 is an example in which a metallic member is disposed at a pipe supplying a cleaning solution.

FIG. 4 shows an example that the metallic member 221 in contact with the cleaning solution is disposed in the pipe 212 for supplying the cleaning solution. The above-described arrangement allows the metallic member 221 to be disposed upstream of the cleaning tank 206 so as to secure the wetted state before the sample nozzle 11a. In the case that the metallic member 221 is disposed at the upper side of the cleaning tank 206, insufficient amount of the cleaning solution, if any, may bring only the sample nozzle 11a into the wetted state in the cleaning solution, thus causing the risk of corrosion. As the wetted portion of the metallic member 221 is brought into contact with the atmosphere, there may cause the risk of precipitation of the cleaning solution component on the metallic member 221. The structure as shown in FIG. 4 is capable of solving the above-described problems.

The present invention is not limited to the structures of the embodiment as described above. It is possible to prepare the metallic cleaning tank 206 so as to serve as the metallic member 221. The ultrasonic generation mechanism has been explained in detail by taking the structure for allowing the vibration head 209 to vibrate in the cleaning solution so as to generate ultrasonic vibration as an example. However, it is possible to dispose the ultrasonic transducer in the cleaning tank as disclosed in Patent Literature 2. Furthermore, the metallic member 221 does not have to be necessarily disposed at the side of the cleaning tank. It is possible to be horizontally and perpendicularly driven together with the sample nozzle 11a of the sample dispensing mechanism 11 so as to be brought into the wetted state in the cleaning solution inside the cleaning tank 206, thus providing the effects.

The first voltage control unit 302 and the second voltage control unit 303 do not have to constantly apply the predetermined potential. Instead, the control may be executed by starting the voltage application just before immersion of the sample nozzle 11a in the cleaning solution, and stopping the voltage application immediately after desorption of the sample nozzle 11a from the cleaning solution after cleaning. This makes it possible to provide the effect of reducing the corrosion of the metallic member 221.

Arbitrary materials may be used for forming the sample nozzle 11a, the ultrasonic head 209, and the metallic member 221. The use of the similar material or the one with almost the same ionization tendency may provide the effect of suppressing the corrosion of the component in preparation for the potentiality that they are kept immersed in the cleaning solution that contains the electrolyte in the power shutdown. Furthermore, as the components provide the effect for suppressing the corrosion so long as they exhibit conductivity, they do not necessarily have to be made of metal.

In the above-described embodiment, the ultrasonic cleaner provided with the ultrasonic transducer has been described as an example. It is also possible to employ the water level sensor or the liquid property sensor. The above-described structure is applicable to the cleaner having at least one conductive member to be wetted in the cleaning solution simultaneously with the sample nozzle 11a to be immersed therein.

The present invention is not limited to the embodiment as described above, but includes various modifications so long as they do not deviate from the spirit of the present invention. For example, the present invention is not limited to the one with all the structures that have been described above, but includes the structure, a part of which is omitted in the range that the effect of the present invention is not degraded.

EXPLANATIONS OF LETTERS OR NUMERALS

1: reaction disk, 2: reaction container, 3: cleaning mechanism, 4: spectrophotometer, 5: stirring mechanism, 6: stirring mechanism, 7: reagent dispensing mechanism, 8: reagent dispensing mechanism, 7a: reagent nozzle, 8a: reagent nozzle, 9: reagent disk, 10: reagent bottle, 11: reagent dispensing mechanism, 12: sample dispensing mechanism, 11a: sample nozzle, 12a: sample nozzle, 13: sample nozzle cleaning tank, 14: sample nozzle cleaning tank, 15: sample container, 16: sample rack, 17: sample transfer mechanism, 18: reagent pump, 19: sample pump, 20: cleaning pump, 21: control unit, 23: ultrasonic cleaner, 24: ultrasonic cleaner, 30: stirring mechanism cleaning tank, 31: stirring mechanism cleaning tank, 32: reagent nozzle cleaning tank, 33: reagent nozzle cleaning tank, 100: automatic analyzer, 201: front mass, 202: back mass, 203: piezoelectric element, 204: bolt, 205: ultrasonic transducer (BLT), 206: cleaning tank, 207: base portion, 208: flange portion, 209: vibration head, 210: vibration head tip portion, 211: cylindrical hole, 212: cleaning solution supply pipe, 213: liquid receiver, 214: drainage, 221: metallic member, 301: liquid level detection control unit, 302: first voltage control unit, 303: second voltage control unit, 305: cradle.

The invention claimed is:

1. A nozzle cleaner which cleans a nozzle of a dispensing mechanism having a liquid level detection function comprising:
a cleaning tank which stores a cleaning solution;
a first conductive member immersed in the cleaning solution that is stored in the cleaning tank;
a first voltage control unit which controls a potential applied to the first conductive member;
an ultrasonic generation mechanism including a second conductive member, which is disposed to have at least a part of the second conductive member immersed in the cleaning solution that is stored in the cleaning tank, and which generates ultrasonic vibration in the cleaning solution that is stored in the cleaning tank; and
a second voltage control unit which controls a potential applied to the second conductive member,
wherein the first voltage control unit applies a second potential to the first conductive member that is higher than a first potential applied to the nozzle,
wherein the second voltage control unit applies a third potential to the second conductive member that is equal to or higher than the first potential,
wherein the ultrasonic generation mechanism is disposed above the cleaning tank in a longitudinal direction and has an ultrasonic transducer having an electrode with a voltage applied thereto to generate ultrasonic vibration,
wherein the ultrasonic generation mechanism includes a vibration head, which serves as the second conductive member, having a portion that extends downward in the longitudinal direction and the portion extending downward is immersed into the cleaning solution,
wherein the vibration head has a cylindrical portion immersed in the cleaning solution and having a cylindrical hole into which the nozzle is inserted, and
wherein the cylindrical hole has a central axis parallel to the longitudinal direction.

2. The nozzle cleaner according to claim 1,
   wherein the third potential is lower than the second potential.
3. The nozzle cleaner according to claim 1, further comprising:
   a pipe which is connected to a bottom portion of the cleaning tank and supplies the cleaning solution to the cleaning tank,
   wherein the first conductive member is provided at the pipe.
4. An automatic analyzer comprising:
   the nozzle cleaner according to claim 1; and
   the dispensing mechanism including the nozzle,
   wherein the nozzle cleaner cleans the nozzle.
5. The automatic analyzer according to claim 4,
   wherein the first conductive member and the second conductive member are formed of the same material as the nozzle or a material having a same ionization tendency.
6. The automatic analyzer according to claim 4,
   wherein the first voltage control unit and the second voltage control unit starts an application of a voltage to the first conductive member and the second conductive member immediately before the nozzle is immersed into the cleaning solution and ends the application of the voltage to the first conductive member and the second conductive member immediately after the nozzle is separated from the cleaning solution.
7. The automatic analyzer according to claim 4,
   wherein the first potential, the second potential, and the third potential are generated by using a potential of a casing of the automatic analyzer as a reference potential.
8. The automatic analyzer according to claim 4,
   wherein an aqueous electrolytic solution is used as the cleaning solution stored in the cleaning tank.

* * * * *